(12) United States Patent
Chung

(10) Patent No.: US 6,853,422 B2
(45) Date of Patent: Feb. 8, 2005

(54) PARTIALLY LIGHT-PENETRATIVE AND PARTIALLY LIGHT-REFLECTIVE LCD STRUCTURE

(75) Inventor: Li-Sen Chung, Penghu (TW)

(73) Assignee: Toppoly Optoelectronics Corp., Miao-Li (TW)

(*) Notice: Subject to any disclaimer, the term of this patent is extended or adjusted under 35 U.S.C. 154(b) by 0 days.

(21) Appl. No.: 10/310,739

(22) Filed: Dec. 5, 2002

(65) Prior Publication Data
US 2004/0001171 A1 Jan. 1, 2004

(30) Foreign Application Priority Data
Jun. 28, 2002 (TW) ..................... 091114391 A

(51) Int. Cl.[7] ............................. G02F 1/1335
(52) U.S. Cl. ................. 349/117; 349/113; 349/114
(58) Field of Search ................. 349/117, 113, 349/114, 96, 138, 158, 147

(56) References Cited

U.S. PATENT DOCUMENTS 6,271,905 B1    8/2001  Sekime et al.
6,281,952 B1 *  8/2001  Okamoto et al. ............. 349/12
6,295,109 B1 *  9/2001  Kubo et al. .................. 349/119
6,330,047 B1 * 12/2001  Kubo et al. .................. 349/147
6,380,997 B1 *  4/2002  Sharp et al. ................. 349/119

* cited by examiner

Primary Examiner—Robert H. Kim
Assistant Examiner—Thoi V. Duong
(74) Attorney, Agent, or Firm—Liu & Liu

(57) ABSTRACT

A partially light-penetrative and partially light-reflective liquid crystal display (LCD) structure is disclosed. The LCD structure includes a top and a bottom substrate structures respectively including half wave plates; a light-penetrative electrode layer formed on a first portion of the bottom substrate structure; a dielectric layer formed on a second portion of the bottom substrate structure; a light-reflective electrode layer formed on the dielectric layer and connected to the light-penetrative electrode layer; and a liquid crystal layer disposed between the light-reflective and light-penetrative electrode layers and the top substrate structure. The thicknesses of the liquid crystal layer above the first and the second portions of the bottom substrate structure, respectively, are selected to allow the liquid crystal layer above the first portion to be equivalent to a half wave plate, and the liquid crystal layer above the second portion to be equivalent to a quarter wave plate.

19 Claims, 5 Drawing Sheets

US 6,853,422 B2

PARTIALLY LIGHT-PENETRATIVE AND PARTIALLY LIGHT-REFLECTIVE LCD STRUCTURE

FIELD OF THE INVENTION

The present invention relates to a liquid crystal display structure, and more particularly to a partially light-penetrative and partially light-reflective LCD structure.

BACKGROUND OF THE INVENTION

For portable electronic appliances, e.g. electronic watches, pocket calculators, personal digital assistants (PDAs) and cell phones, liquid crystal displays (LCDs) are the most popular displays for revealing the information. Among the displays, a light-reflective LCD is the majority. In order to enhance the displaying ability of the light-reflective LCD in a relatively dark environment, it is preferred that the LCD be imparted thereto light-penetrative feature to some extent Accordingly, a partially light-penetrative and partially light-reflective LCD structure is developed.

Please refer to FIGS. 1A and 1B which are schematic cross-sectional diagrams showing the structure of a conventional partially light-penetrative and partially light-reflective LCD structure with and without applied voltage, respectively. The LCD structure comprises of a back light source 10, a bottom polarizer plate 11, a first wide-band quarter wave plate 12, a transparent bottom glass plate 13, a liquid crystal layer 14, a transparent top electrode 15, a transparent top glass plate 16, a second wide-band quarter wave plate 17, a top polarizer plate 18, and a pixel electrode layer 19. The pixel electrode layer 19 includes a light-penetrative electrode region 191 and a light-reflective electrode region 192 for achieving the functions of partial penetration and partial reflection of the LCD structure.

In a portion of the LCD structure of FIG. 1A including the light-penetrative electrode 191, there is no voltage applied between the pixel electrode 191 and transparent top electrode 15. Therefore, the liquid crystal molecules in the layer 14 are in an initial state and delay light passing therethrough by a phase difference d. Therefore, the overall phase difference of the light provided by the back light source 10 is the sum of a quarter wavelength, the phase difference d and another quarter wavelength, respectively resulting from the delaying effects of the first wide-band quarter wave plate 12, the liquid crystal layer 14 and the second wide-band quarter wave plate 17. That is, the overall phase difference is a half wavelength plus d, and the light delayed by a half wavelength plus d will penetrate the polarizer plate 18 to reach the observer's eyes. This display portion will thus be all-bright. On the other hand, when a voltage is applied between the pixel electrode 191 and transparent top electrode 15, the liquid crystal molecules in the layer 14 will become upright, as shown in FIG. 1B. When all the liquid crystal molecules are upright, the light-phase delaying effect of the liquid crystal layer 14 will be diminished, i.e. d=0. Accordingly, the overall phase difference becomes a half wavelength. The light with such phase difference is not allowed to penetrate the polarizer plate 18, and thus this display portion will be all-dark.

Further, in another portion of the LCD structure of FIG. 1A including the light-reflective electrode 192, there is no voltage applied between the pixel electrode 191 and the transparent top electrode 15. Therefore, the liquid crystal molecules in the layer 14 is in an initial state and delay light passing therethrough two times by a phase difference 2d. Therefore, the overall phase difference of the light provided by the back light source 10 is the sum of a quarter wavelength, the phase difference 2d and another quarter wavelength, respectively resulting from the delaying effects of the second wide-band quarter wave plate 17, twice the liquid crystal layer 14 and the second wide-band quarter wave plate 17 again. That is, the overall phase difference is a half wavelength plus 2d, and the light delayed by a half wavelength plus 2d will penetrate the polarizer plate 18 to reach the observer's eyes. This display portion will thus be all-bright. On the other hand, when a voltage is applied between the pixel electrode 192 and transparent top electrode 15, the liquid crystal molecules in the layer 14 will become upright, as shown in FIG. 1B. When all the liquid crystal molecules are upright, the light-phase delaying effect of the liquid crystal layer 14 will be diminished, i.e. d=0. Accordingly, the overall phase difference becomes a half wavelength. The light with such phase difference is not allowed to penetrate the polarizer plate 18, and thus this display portion will be all-dark.

The first wide-band quarter wave plate 12 or the second wide-band quarter wave plate 17 is conventionally provided by overlapping a quarter wave plate and a half wave plate. In order to achieve the wide-band function and make the light within a certain wavelength range have a phase difference of a quarter wavelength, the relationship among the slow axes S1 and S2 of the quarter and the half wave plates and the transmission axis T of the bottom polarizer plate 11 or the top polarizer plate 18 is required to be in a certain manner, for example as shown in FIG. 2. Therefore, the manufacturing and assembling of the wide-band quarter wave plate 12 or 17 is complicated, and the cost is high.

SUMMARY OF THE INVENTION

Therefore, an object of the present invention is to provide a liquid crystal display (LCD) structure that includes a single phase delay plate so as to simplify the manufacturing and assembling processes and reduce cost.

A first aspect of the present invention relates to a liquid crystal display (LCD) structure, which comprises a top substrate structure including a first phase delay plate; a bottom substrate structure including a second phase delay plate; a light-penetrative electrode structure formed over a first portion of an upper surface of the bottom substrate structure, and having a first clearance from the top substrate structure; a light-reflective electrode structure formed over a second portion of the upper surface of the bottom substrate structure, and having a second clearance from the top substrate structure, wherein the second clearance is different from but correlates to the first clearance; a common electrode structure disposed between a lower surface of the top substrate structure and the light-penetrative and light-reflective electrode structures, and cooperating with the light-penetrative electrode structure and the light-reflective electrode structure to provide a voltage; and a liquid crystal layer disposed between the common electrode structure and the light-reflective and light-penetrative electrode structures, and oriented in a specific manner in response to the voltage.

Preferably, the first phase delay plate and the second phase delay plate are both single plates. More preferably, the first phase delay plate and the second phase delay plate are both half wave plates.

In an embodiment, the second clearance is substantially a half of the first clearance by spacing the light-reflective electrode structure from the bottom substrate structure by a dielectric layer. A first portion of the liquid crystal layer disposed between the light-penetrative electrode structure and the common electrode structure is equivalent to a half wave plate, and a second portion of the liquid crystal layer disposed between the light-reflective electrode structure and the common electrode structure is equivalent to a quarter wave plate.

Generally, each of the top and bottom substrate structures includes a light-penetrative substrate; the phase delay plate disposed at a side of the light-penetrative substrate opposite to the electrode structure; and a polarizer plate disposed at a side of the phase delay plate opposite to the light-penetrative substrate.

A second aspect of the present invention relates to a liquid crystal display (LCD) structure, which comprises a top substrate structure including a first half wave plate; a bottom substrate structure including a second half wave plate; a light-penetrative electrode structure formed over a first portion of the bottom substrate structure, and having a first clearance from the top substrate structure; a light-reflective electrode structure formed over a second portion of the bottom substrate structure, and having a second clearance from the top substrate structure, wherein the second clearance is a half of the first clearance; and a liquid crystal layer disposed between the light-reflective and light-penetrative electrode structures and the top substrate structure, wherein a first part of the liquid crystal layer above the light-penetrative electrode structure is equivalent to a half wave plate, and a second part of the liquid crystal layer above the light-reflective electrode structure is equivalent to a quarter wave Generally, the top substrate structure further includes a light-penetrative substrate; a light-penetrative common electrode formed at a first side of the light-penetrative substrate; and a polarizer plate disposed at second side of the light-penetrative substrate, and sandwiching the first half wave plate therebetween with the light-penetrative substrate. The bottom substrate structure further includes a light-penetrative substrate lying under the light-reflective and light-penetrative electrode structures; and a polarizer plate lying under the light-penetrative substrate, and sandwiching the second half wave plate therebetween with the light-penetrative substrate. The LCD structure further comprises a back light source disposed under the bottom substrate structure.

Preferably, the light-reflective electrode structure includes a dielectric layer disposed on the light-penetrative substrate; and a light-reflective electrode layer disposed on the dielectric layer in connection to the light-penetrative electrode structure.

For example, the dielectric layer can be formed of silicon oxide or silicon nitride. The light-reflective electrode layer can be formed of aluminum or silver.

A third aspect of the present invention relates to a liquid crystal display (LCD) structure, which comprises a top substrate structure including a first half wave plate; a bottom substrate structure including a second half wave plate; a light-penetrative electrode layer formed on a first portion of the bottom substrate structure; a dielectric layer formed on a second portion of the bottom substrate structure; a light-reflective electrode layer formed on the dielectric layer and connected to the light-penetrative electrode layer; and a liquid crystal layer disposed between the light-reflective and light-penetrative electrode layers and the top substrate structure, wherein a first part of the liquid crystal layer above the light-penetrative electrode layer is equivalent to a half wave plate, and a second part of the liquid crystal layer above the light-reflective electrode layer is equivalent to a quarter wave plate.

BRIEF DESCRIPTION OF THE DRAWINGS

The present invention may best be understood through the following description with reference to the accompanying drawings, in which:

FIGS. 3A and 3B are schematic cross-sectional diagrams showing a preferred embodiment of a partially light-penetrative and partially light-reflective LCD structure according to the present invention with and without applied voltage, respectively.

DETAILED DESCRIPTION OF TIME PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3A:
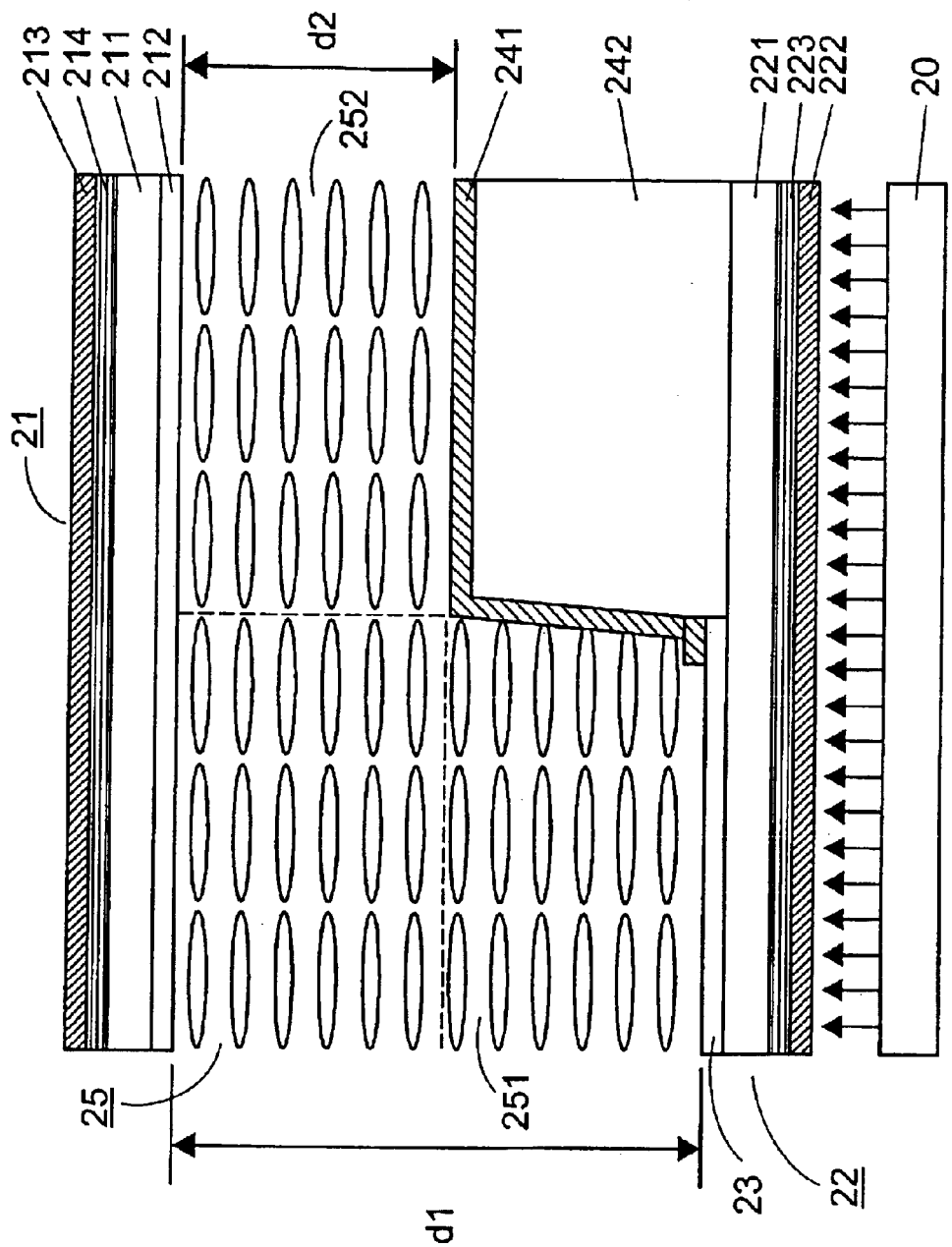
FIG. 3A is a schematic cross-sectional side view of a preferred embodiment of a flat flexible cable according to the present invention.
Figure 3B:
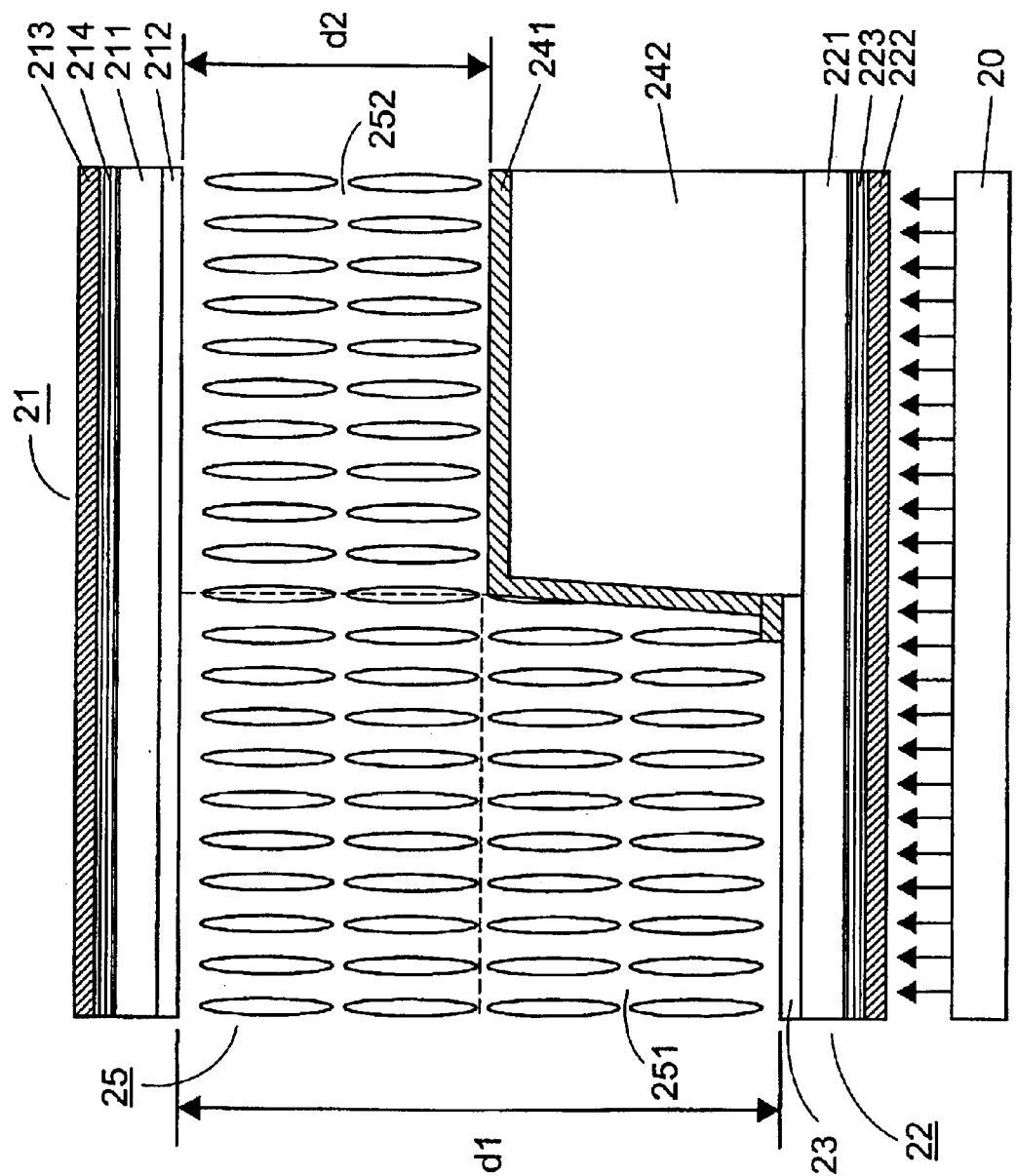

Please refer to FIGS. 3A and 3B. The LCD structure comprises of a back light source 20, a light-penetrative substrate 211, a light-penetrative common electrode 212, a polarizer plate 213, a half wave plate 214, another light-penetrative substrate 221, another polarizer plate 222, another half wave plate 223, a light-penetrative electrode layer 23, a light-reflective layer 241 and a dielectric layer 242. There is a clearance d1 between the light-penetrative electrode layer 23 and the light-penetrative common electrode 212, and a clearance d2 between the light-reflective electrode layer 241 and the light-penetrative common electrode 212.

According to a preferred embodiment of the present invention, it is designed to have d2 equals to a half of d1. In other words, the thickness of the portion 251 of the liquid crystal layer above the light-penetrative electrode layer 23 doubles that of the portion 252 of the liquid crystal layer above the light-reflective electrode layer 241. By arranging such liquid crystal layer between two half wave plates 214 and 223, the liquid crystal portion 251 is equivalent to a half wave plate, and the liquid crystal portion 252 is equivalent to a quarter wave plate.

Figure 1A:
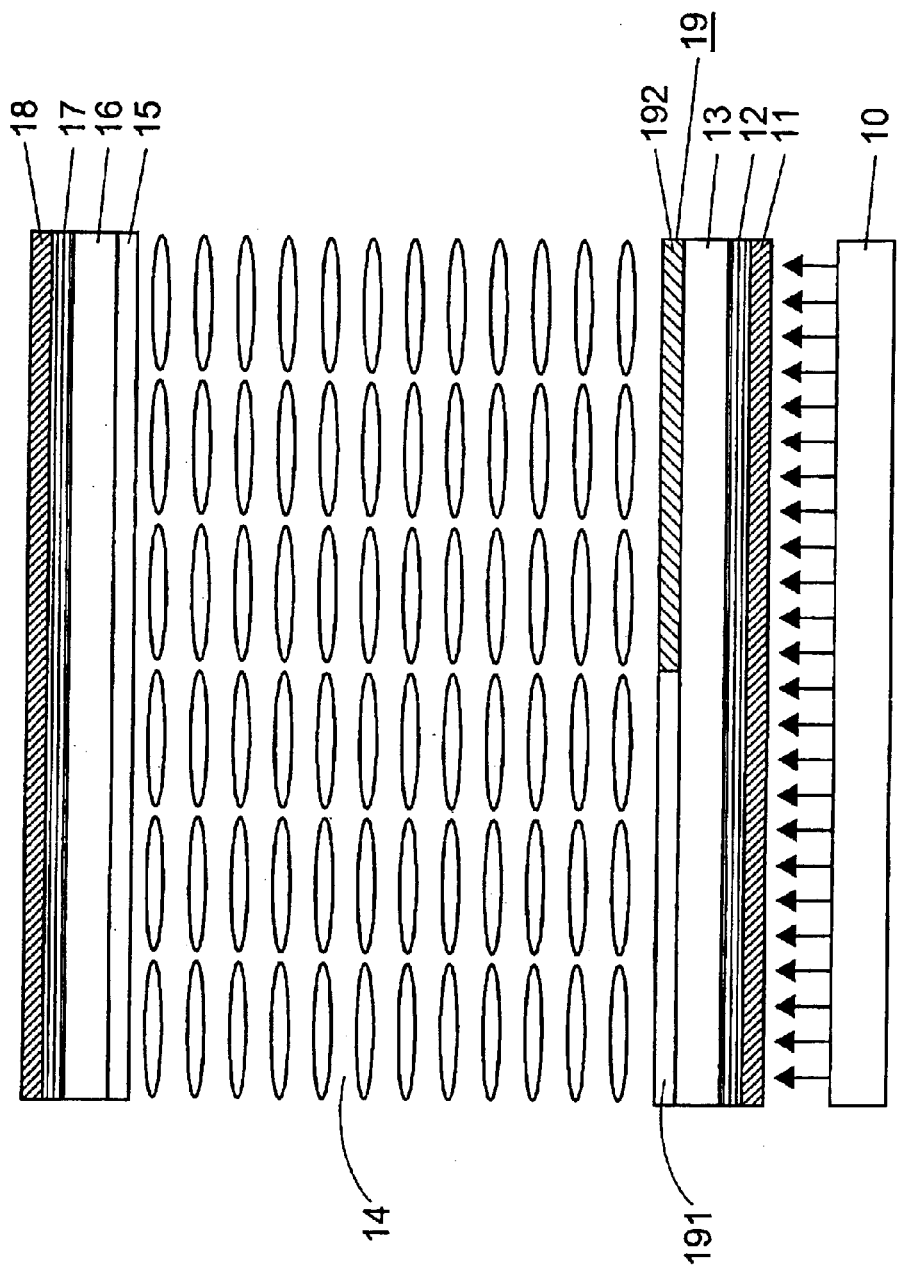
FIGS. 1A and 1B are schematic cross-sectional diagrams showing the structure of a conventional partially light-penetrative and partially light-reflective LCD structure with and without applied voltage, respectively.
Figure 1B:
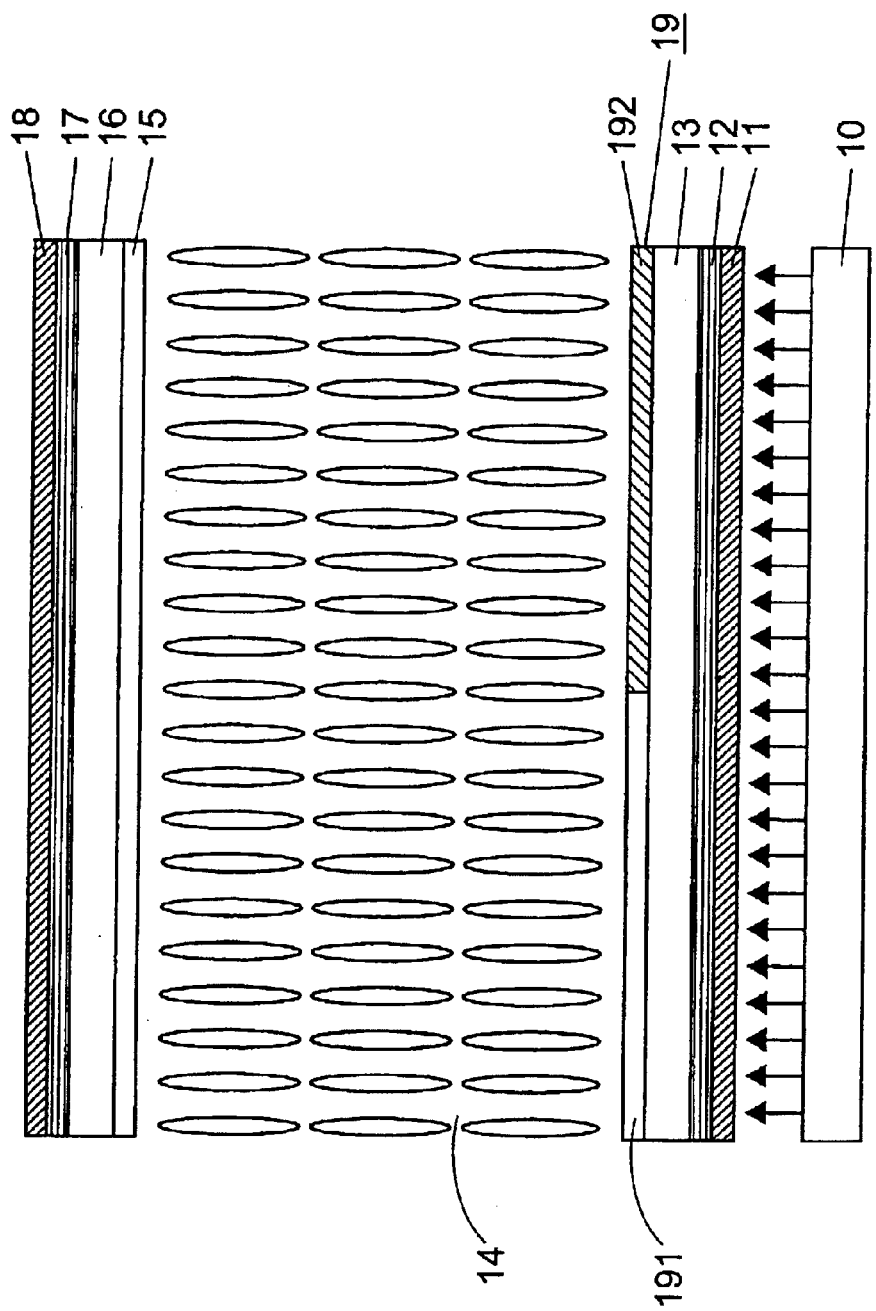
Figure 2:
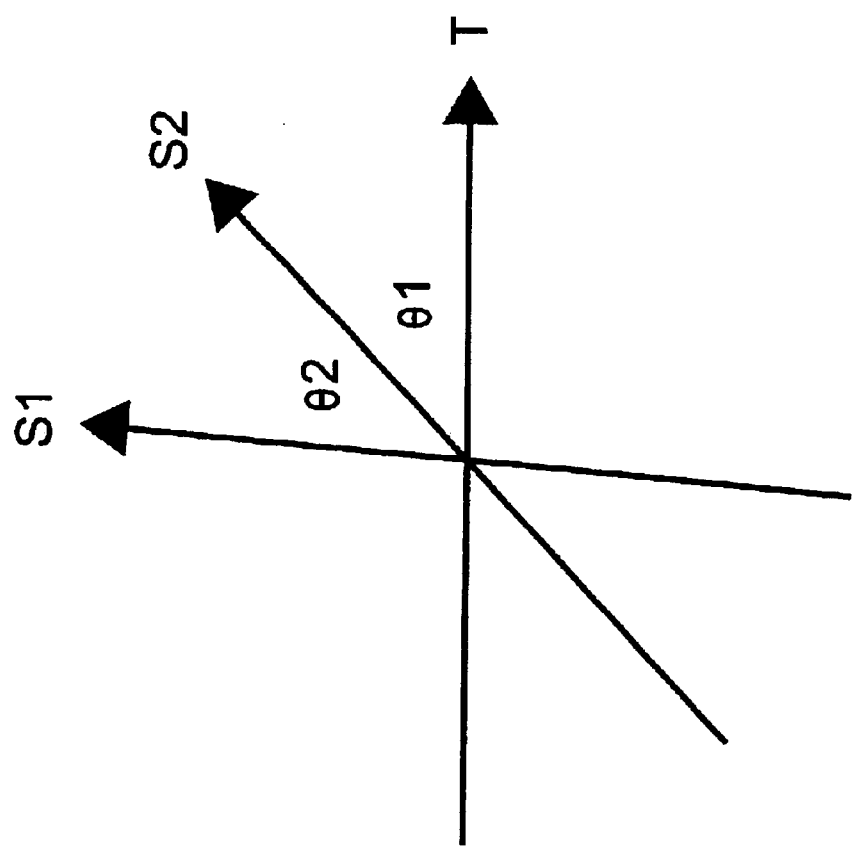
FIG. 2 is a schematic diagram showing the relationship among the slow axes and of the quarter and the half wave plates and the transmission axis of the bottom or the top polarizer plate of FIG. 1.

Please refer to the left portion of the LCD structure in FIG. 3A, including the light-penetrative electrode 23. There is no voltage applied between the common electrode 212 and light-penetrative electrode 23. Therefore, the liquid crystal molecules 251 are in an initial state and delay light passing therethrough by a phase difference of a half wavelength. In other words, the upper half of the liquid crystal portion 251 serves as a quarter wave plate to form a wide-band quarter wave plate with the top half wave plate 214, and the lower half of the liquid crystal portion 251 serves as another quarter wave plate to form another wide-band quarter wave plate with the bottom half wave plate 223 according to the principle illustrated in FIG. 2.

Therefore, when the light emitted by the back light source 20 pass through the two wide-band quarter wave plates, the phase thereof would be delayed by a half wavelength, and thus the light is not allowed to penetrate the polarizer plate 213 to be observed. In other words, this area covering the liquid crystal portion 251 is all-dark. On the other hand, when voltage is applied, the liquid crystal molecules become upright, as shown in FIG. 3B, so the liquid crystal layer portion 251 does not contribute to phase delay. Under this circumstance the overall phase difference of the light will not be exactly a half wavelength, so the light is allowed to penetrate the polarizer plate 213 to be observed. The area covering the liquid crystal portion 251 becomes all-bright.

As for the LCD structure shown in the right portion of FIG. 3A or 3B, where an additional dielectric layer 242 is sandwiched between the light-penetrative substrate 221 and the light-reflective electrode layer 241, the external light passes through the half wave plate 214 twice and the quarter wave plate implemented by the liquid crystal portion 252 twice before it is reflected out of the LCD structure. The overall phase delay in this light-reflective region is the same as that in the above-mentioned light-penetrative region. Therefore, the area covering the liquid crystal portion 252 is also all-dark when no voltage is applied, and all-bright when voltage is applied.

By properly adjusting the clearances between the common electrode layer 212 and the light-penetrative and light-reflective electrode layers 23 and 241 to control the thickness profile of the liquid crystal layer 25, the liquid crystal molecules may serve as a part of the desired wide-band quarter wave plates. Therefore, a single wave plate is enough for each of the top and bottom substrate structures. The manufacturing and assembling laboring and cost can thus be reduced.

In the above embodiment, for example, the light-penetrative substrate 211 or 221 can be a glass substrate. The light-penetrative common electrode layer 212 can be formed of indium-tin oxide (ITO). The dielectric layer 242 can be formed of silicon oxide or silicon nitride. The light-reflective electrode layer 241 can be made of aluminum or silver. The initial state of the liquid crystal molecules is possibly a horizontal homogeneous manner, a hybrid manner or a bending manner.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display (LCD) structure, comprising:
   a top substrate structure including a first phase delay structure equivalent to a half wave plate;
   a bottom substrate structure including a second phase delay structure equivalent to a half wave plate;
   a light-penetrative electrode structure formed over a first portion of an upper surface of said bottom substrate structure, and having a first clearance from said top substrate structure;
   a light-reflective electrode structure formed over a second portion of said upper surface of said bottom substrate structure, and having a second clearance from said top substrate structure, wherein said second clearance is different from but correlates to said first clearance;
   a common electrode structure disposed between a lower surface of said top substrate structure and said light-penetrative and light-reflective electrode structures, and cooperating with said light-penetrative electrode structure and said light-reflective electrode structure to provide a voltage; and
   a liquid crystal layer disposed between said common electrode structure and said light-reflective and light-penetrative electrode structures, and oriented in a specific manner in response to said voltage,
   wherein the first phase delay structure and second phase delay structure are the only phase delay structures with the liquid crystal layer therebetween.

2. The LCD structure according to claim 1 wherein said second clearance is substantially a half of said first clearance.

3. The LCD structure according to claim 1 wherein a first portion of said liquid crystal layer disposed between said light-penetrative electrode structure and said common electrode structure is equivalent to a half wave plate, and a second portion of said liquid crystal layer disposed between said light-reflective electrode structure and said common electrode structure is equivalent to a quarter wave plate.

4. The LCD structure according to claim 1 wherein each of said top and bottom substrate structures includes:
   a light-penetrative substrate;
   said first phase delay structure disposed at a side of said light-penetrative substrate opposite to said electrode structure; and
   a polarizer plate disposed at a side of said phase delay structure opposite to said light-penetrative substrate.

5. The LCD structure according to claim 4 wherein said light-reflective electrode structure is spaced from said light-penetrative substrate of said bottom substrate structure by a dielectric layer.

6. A liquid crystal display (LCD) structure, comprising:
   a top substrate structure including a first half wave plate as a phase delay plate;
   a bottom substrate structure including a second half wave plate as a phase delay plate;
   a light-penetrative electrode structure formed over a first portion of said bottom substrate structure, and having a first clearance from said top substrate structure;
   a light-reflective electrode structure formed over a second portion of said bottom substrate structure, and having a second clearance from said top substrate structure, wherein said second clearance is a half of said first clearance; and
   a liquid crystal layer disposed between said light-reflective and light-penetrative electrode structures and said top substrate structure, wherein a first part of said liquid crystal layer above said light-penetrative electrode structure is equivalent to a half wave plate, and a second part of said liquid crystal layer above said light-reflective electrode structure is equivalent to a quarter wave plate,
   wherein the first half wave plate and second half wave plate are the only phase delay plates with the liquid crystal layer therebetween.

7. The LCD structure according to claim 6 wherein said top substrate structure further includes:

a light-penetrative substrate;

a light-penetrative common electrode formed at a first side of said light-penetrative substrate; and a polarizer plate disposed at a second side of said light-penetrative substrate, and sandwiching said first half wave plate therebetween with said light-penetrative substrate.

8. The LCD structure according to claim 6 wherein said bottom substrate structure further includes:

a light-penetrative substrate lying under said light-reflective and light-penetrative electrode structures; and a polarizer plate lying under said light-penetrative substrate, and sandwiching said second half wave plate therebetween with said light-penetrative substrate.

9. The LCD structure according to claim 8 wherein said light-reflective electrode structure includes:

a dielectric layer disposed on said light-penetrative substrate; and a light-reflective electrode layer disposed on said dielectric layer in connection to said light-penetrative electrode structure.

10. The LCD structure according to claim 9 wherein said dielectric layer is formed of a material selected from a group consisting of silicon oxide and silicon nitride.

11. The LCD structure according to claim 9 wherein said light-reflective electrode layer is formed of a material selected from a group consisting of aluminum and silver.

12. The LCD structure according to claim 6 further comprising a back light source disposed under said bottom substrate structure.

13. A liquid crystal display (LCD) structure, comprising:

a top substrate structure including a half wave plate as a first phase delay structure;

a bottom substrate structure including a half wave plate as a second phase delay structure;

a light-penetrative electrode layer formed on a first portion of said bottom substrate structure;

a dielectric layer formed on a second portion of said bottom substrate structure;

a light-reflective electrode layer formed on said dielectric layer and connected to said light-penetrative electrode layer; and a liquid crystal layer disposed between said light-reflective and light-penetrative electrode layers and said top substrate structure, wherein a first part of said liquid crystal layer above said light-penetrative electrode layer is equivalent to a half wave plate, and a second part of said liquid crystal layer above said light-reflective electrode layer is equivalent to a quarter wave plate, wherein the first phase delay structure and second phase delay structure are the only phase delay structures with the liquid crystal layer therebetween.

14. The LCD structure according to claim 13 wherein said dielectric layer is formed of a material selected from a group consisting of silicon oxide and silicon nitride.

15. The LCD structure according to claim 13 wherein said light-reflective electrode layer is formed of a material selected from a group consisting of aluminum and silver.

16. A liquid crystal display (LCD) structure having a light-penetrative region and a light-reflective region, comprising:

a first phase delay structure equivalent to a half wave plate;

a second phase delay structure equivalent to a half wave plate;

a reflective structure; and a liquid crystal layer having a first portion of a first operative thickness between the first phase delay structure and the second phase delay structure corresponding to the light-penetrative region, and a second portion of a second operative thickness between the first phase delay structure and the reflective structure corresponding to the light-reflective region, wherein the first operative thickness is relatively thicker than the second operative thickness, wherein the first phase delay structure and second phase delay structure are the only phase delay structures with the liquid crystal layer therebetween.

17. The LCD structure as in claim 16, wherein at least one of the first phase delay structure and second phase delay structure comprises a single half wave plate.

18. The LCD structure as in claim 17, wherein the first region of the liquid crystal layer is equivalent to a half wave plate, and the second region of the liquid crystal layer is equivalent to a quarter wave plate.

19. The LCD structure as in claim 16, wherein the first region of the liquid crystal layer is equivalent to a half wave plate, and the second region of the liquid crystal layer is equivalent to a quarter wave plate.

* * * * *